Patented July 4, 1944

2,352,848

UNITED STATES PATENT OFFICE 2,352,848

STEROIDAL HORMONE INTERMEDIATES AND PREPARATION OF THE SAME

Russell Earl Marker, State College, Pa., assignor to Parke, Davis & Company, Detroit, Mich., a corporation of Michigan No Drawing. Application February 5, 1940, Serial No. 317,419

6 Claims. (Cl. 260—397.4)

This invention relates to steroidal hormone intermediates and preparation of the same, and, more particularly, to the preparation of new steroidal sapogenin derivatives useful as intermediates for the manufacture of hormones.

One of the objects of this invention is to prepare new steroidal sapogenin derivatives which can readily be converted to pregnane derivatives.

In my copending application, Serial No. 393,667, filed May 15, 1941, I have set forth the preparation of new sapogenin derivatives which I designate as pseudo-sapogenins and have also set forth the manner in which the pseudo-sapogenins may be oxidized to form $\Delta^{16}$-20-keto-pregnene compounds, i. e. steroids having in ring D the structure

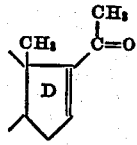

In my copending application Serial No. 393,668, filed May 15, 1941, I have disclosed and claimed a certain group of $\Delta^{16}$-20-keto-pregnene compounds which are easily prepared from the readily available sarsapogenin.

The present application describes another valuable group of $\Delta^{16}$-20-keto-pregnene compounds having at $C_2$, $C_3$ and $C_6$ a member of the class of groupings

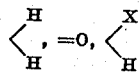

where X is one of the class —OH, —O—acyl, —O—alkyl, —O—aryl, —O—aralkyl and halogen or similar group hydrolyzable to —OH, not more than one of the groupings at $C_2$ and $C_6$ being

when the $C_3$ substituent group is an oxygenated group, for example

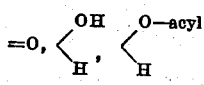

and the like.

The compounds of this invention may be obtained, for example, from the known sapogenins, chlorogenin, diosgenin and gitogenin which differ from one another only in regard to the connections between rings A and B, the degree of saturation of the ring system and the number of substituents attached to these rings.

The structures of rings A and B of these compounds are shown below:

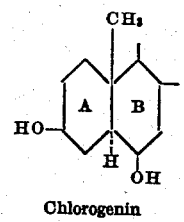

Chlorogenin

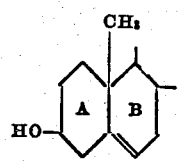

Diosgenin

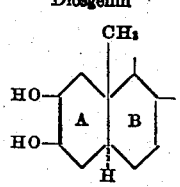

Gitogenin

In this new class of compounds the ester, ether and halogen derivatives are usually made from the corresponding free hydroxylic compounds by any of the known methods for converting a secondary alcohol into its ester, ether or halogen derivative. For example, esters are made by reacting the hydroxyl compounds with carboxylic acid acylating agents such as acid chlorides, acid anhydrides and the like. Halides can be made, for example, by reacting the hydroxyl compound with a halogenating agent such as thionyl chloride, phosphorus halide, and the like. The halogen derivatives can, if desired, be converted, by reaction with alkali metal alcoholates or alkali metal phenolates, into the corresponding ethers. The ethers may also be made by condensing the alcoholic sapogenin derivatives with themselves or other alcohols in presence of agents facilitating elimination of water from the reactants, such as sulfuric or phosphoric acids.

The invention is illustrated by the following examples.

*Example 1*

(a) A mixture of 2.5 grams of chlorogenin and 30 cc. of acetic anhydride is heated at 200° for 10 hours. The acetic anhydride is then evaporated in vacuo and the syrupy residue hydrolyzed with hot alcoholic potassium hydroxide. The small white crystals which separate on dilution are collected and washed well with alcohol. The product thus obtained is pseudo-chlorogenin and after recrystallization from acetone has the M. P. 268–270° C. It gives a large depression with a sample of chlorogenin. The substance is very sparingly soluble in acetone, ethyl acetate, ether, alcohol and similar solvents.

(b) 2 grams of psuedo-chlorogenin as thus prepared are dissolved in 300 cc. of acetic acid and a solution of 2 grams of chromic anhydride in 20 cc. of 80% acetic acid is added at room temperature. After standing for about an hour, a small amount of alcohol is added and most of the acetic acid removed by vacuum distillation. The residue is dissolved in ether and washed well with water and dilute sodium hydroxide solution. The ethereal extract is evaporated to dryness on a steam bath and the residue recrystallized from alcohol. Thus there is obtained crystals of $\Delta^{16}$-allo-pregnenetrione-3,6,20, M. P. 226° C.

(c) Five-tenths of a gram of $\Delta^{16}$-pregnenetrione-3,6,20 is dissolved in 100 cc. of acetic acid and shaken in the presence of 0.5 gram of Adams' platinum oxide catalyst in a hydrogen atmosphere at about 40 lbs. pressure for 3 hours. Then the catalyst is removed by filtration and the acetic acid evaporated in vacuo. The residue may be crystallized from acetone to give allo-pregnanetriol-3,6,20 as white crystals. On oxidation with an equal weight of chromic anhydride in acetic acid solution at room temperature and working up the product, there is obtained allo-pregnanetrione-3,6,20 of M. P. 235° C.

*Example 2*

(a) A mixture of 2 grams of diosgenin, 30 cc. of benzoyl chloride and 15 grams of freshly fused sodium acetate is heated in an oil bath at 220° C. for 10 hours. Then the mixture is distilled in vacuo until no more distillate can be collected at 200° C. and 10 mm. pressure. The residue in the distilling flask is cooled and alcoholic sodium hydroxide solution is added. After warming for one-half hour, the mixture is diluted with water and ether, and the layers separated. The ethereal layer is washed with water and dilute sodium hydroxide and then evaporated to dryness on a steam bath. This residue is pseudo-diosgenin. It may be purified by crystallization from slightly diluted alcohol and is thus obtained as white crystals which readily decolorize bromine in acetic acid.

(b) One gram of pseudo-diosgenin is dissolved in 100 cc. of acetic acid. Five cc. of sulfuric acid are added and then in small portions, and with constant stirring, there is added 1 gram of powdered potassium permanganate. After stirring for 6 hours at room temperature, sulfur dioxide is passed into the mixture with cooling until the solution is nearly colorless. The mixture is concentrated in vacuo to a small volume and then diluted with water and ether extracted. The ethereal layer is washed well with dilute alkali and water, and evaporated to dryness. The yellow residue may be recrystallized from acetone to give yellow crystals of $\Delta^{4,16}$-pregnadiene-trione-3,6,20.

(c) To 200 mgs. of the above $\Delta^{4,16}$-pregnadiene-trione-3,6,20 in 10 cc. of acetic acid is added 500 mgs. of zinc dust and the mixture heated for 1 hour on the steam bath. The mixture is diluted with water and extracted with ether and the ethereal extract washed well with water and dilute alkali. The ether is removed on the steam bath and the residue crystallized from slightly diluted methanol. This product is allo-pregnanetrione-3,6,20.

*Example 3*

(a) One gram of gitogenin is heated in a bomb tube with 20 cc. of acetic anhydride for 10 hours. The acetic anhydride is removed in vacuo and the residue warmed for one-half hour with an excess of alcoholic potassium hydroxide solution. Then the mixture is diluted with water and extracted with ether. The ethereal extract is washed with water and the ether evaporated on the steam bath. The residue is pseudo-gitogenin which may be purified by crystallization from methanol to give white crystals.

(b) Seven-tenths of a gram of pseudo-gitogenin are warmed on a steam bath with 5 cc. of nitric acid for one-half hour. The mixture is cooled, diluted with water and ether extracted. The ethereal extract is shaken with sodium hydroxide solution and the sodium hydroxide solution then acidified with dilute hydrochloric acid. The precipitate is collected, washed well with water and recrystallized from chloroform. The acid thus obtained is an etio-bilianic acid derivative in which ring A has been opened. It may be represented by the following formula,

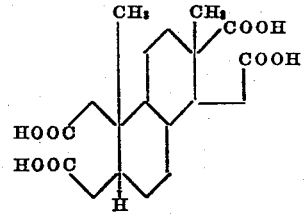

(c) When pseudo-gitogenin is acetylated and then oxidized with an equal weight of chromic anhydride in acetic acid at room temperature, and the reaction product worked-up as described in the previous examples, the major product is $\Delta^{16}$-allo-pregnenone-20-diol-2,3-diacetate.

*Example 4*

(a) Pseudo-chlorogenin is prepared as described, for instance, in Example 1.

(b) A solution of 2 g. of pseudo-chlorogenin in 300 cc. of acetic acid is mixed with 0.5 g. of platinum oxide catalyst, and the suspension shaken in a hydrogen atmosphere at room temperature and 40 lbs. pressure for three hours. Then the mixture is filtered, and the filtrate evaporated to dryness. The residue is crystallized from alcohol and this gives dihydro-pseudo-chlorogenin, M. P. 270°. This substance gives a depression in melting point with pseudo-chlorogenin which also has M. P. 270°.

(c) A mixture of 1 g. of dihydro-pseudo-chlorogenin and 10 cc. of acetic anhydride is refluxed for a half hour. Then the excess acetic anhydride is removed in vacuo and the residue crystallized from methanol to give pure dihydro-pseudo-chlorogenin triacetate, M. P. 150°.

(d) To a solution of 4 grams of dihydro-pseudo-chlorogenin diacetate in 200 cc. of acetic acid is added a solution of 6 grams of chromic anhydride in 50 cc. of 80% acetic acid. After standing at room temperature for 90 minutes, water is added and the mixture extracted with ether. The ethereal layer is washed with water and 3% sodium hydroxide solution. The ethereal extract is evaporated and this gives Δ$^{16}$-allo-pregnenone-20-diol-3,6.

(e) A mixture of 250 mgms. of Δ$^{16}$-allo-pregnenone-20-diol-3,6, 120 cc. of absolute alcohol and 1 gram of palladium-barium sulfate catalyst is shaken with hydrogen at 1 atmosphere pressure at room temperature for 90 minutes. The catalyst is removed by filtration and the solvent evaporated in vacuo. The residue is crystallized from aqueous alcohol to give allo-pregnanone-20-diol-3,6, M. P. 210°.

The palladium-barium sulfate catalyst used in this preparation is prepared according to the directions given in Houben-Weyl Arbeitsmethoden d. Organischen Chemie, 3rd ed. II, 323.

What I claim as my invention is:

1. A Δ$^{16}$-unsaturated-20-keto-pregnene substituted in rings A and B at C–3 and one of C–2 and C–6 by two hydroxyl groups.

2. A compound having the formula,

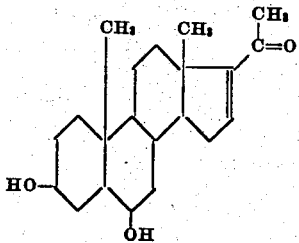

3. A Δ$^{16}$-unsaturated-20-keto-pregnene substituted in rings A and B at C$_3$ and one of C$_2$ and C$_6$ by a member of the class consisting of —OH and groups hydrolyzable to —OH.

4. A compound having the formula,

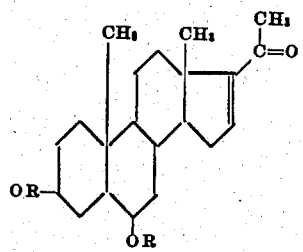

where OR is a member of the class consisting of —OH and groups hydrolyzable to —OH.

5. Δ$^{16}$-allo-pregnenone-20-diol-2,3-diacetate.

6. Δ$^{16}$-allo-pregnenone-20-diol-3,6.

RUSSELL EARL MARKER.